United States Patent
Park

(10) Patent No.: US 6,832,012 B2
(45) Date of Patent: Dec. 14, 2004

(54) POLARIZATION MAINTAINING OPTICAL FIBER AND PROJECTION DISPLAY OF THE SAME

(75) Inventor: Chan Young Park, Seoul (KR)

(73) Assignee: LG Electronics, Inc., Seoul (KR)

( * ) Notice: Subject to any disclaimer, the term of this patent is extended or adjusted under 35 U.S.C. 154(b) by 193 days.

(21) Appl. No.: 10/191,028

(22) Filed: Jul. 2, 2002

(65) Prior Publication Data

US 2003/0007714 A1 Jan. 9, 2003

(30) Foreign Application Priority Data

| Jul. 6, 2001 | (KR) | ......... 2001-40460 |
| Jul. 6, 2001 | (KR) | ......... 2001-40461 |

(51) Int. Cl.[7] .................................... G02B 6/00
(52) U.S. Cl. ..................... 385/11; 385/31; 385/39
(58) Field of Search ....................... 385/11, 76–77, 385/33, 39, 31

(56) References Cited

U.S. PATENT DOCUMENTS

| 3,030,852 | A | * | 4/1962 | Courtney-Pratt ............ 385/116 |
| 3,756,690 | A | * | 9/1973 | Borrelli et al. ................ 385/1 |
| 4,746,191 | A | * | 5/1988 | Kawakami et al. ........... 385/16 |
| 5,329,118 | A | * | 7/1994 | Riza ....................... 250/227.12 |
| 5,471,545 | A | * | 11/1995 | Negami et al. ................ 385/1 |
| 5,510,806 | A | * | 4/1996 | Busch ........................... 345/87 |
| 5,848,203 | A | * | 12/1998 | Kawakami et al. ........... 385/11 |
| 5,889,900 | A | * | 3/1999 | Hallemeier .................. 385/11 |
| 5,967,635 | A | * | 10/1999 | Tani et al. .................... 353/20 |
| 6,535,655 | B1 | * | 3/2003 | Hasui et al. ................. 385/11 |
| 6,687,010 | B1 | * | 2/2004 | Horii et al. ................. 356/479 |

FOREIGN PATENT DOCUMENTS

| JP | 63-235912 | 9/1988 | .......... G02B/27/00 |

* cited by examiner

*Primary Examiner*—Ellen E. Kim
(74) *Attorney, Agent, or Firm*—Lee, Hong, Degerman, Kang & Schmadeka

(57) ABSTRACT

Optical fiber including a core, a cladding surrounding the core, having a refractive index lower than the core, and polarization beam splitter layers in an incident part and emission part at opposite ends of the core, for transmission of a particular polarized beam, for maintaining a polarization direction of an incident beam to enhance an optical utilization efficiency, and projection display system including a beam source of a polarization direction, an optical fiber for reflecting the laser beam to transmit the laser beam therethrough, and maintaining the polarization direction, vibration means connected to the optical fiber at least one or more than point, for vibrating the optical fiber, to vary a phase of the laser beam passing through the optical fiber, a display panel, and a projection optical system for enlarging and projecting the picture from the display panel onto a screen, thereby providing an excellent picture quality.

13 Claims, 4 Drawing Sheets

POLARIZATION MAINTAINING OPTICAL FIBER AND PROJECTION DISPLAY OF THE SAME

This application claims the benefit of the Korean Application Nos. P2001-40460, and P2001-40461, both filed on Jul. 6, 2001, which are hereby incorporated by reference.

BACKGROUND OF THE INVENTION

1. Field of the Invention

The present invention relates to optical fiber, and more particularly, to optical fiber that can prevent polarization variation for enhancing an optical efficiency, and a projection display of the same that can provide a high picture quality.

2. Background of the Related Art

In general, the optical fiber is a fibrous waveguide for transmission of a light widely used in optical communication, optical measurement, optical transmission, and the like.

A basic principle of the optical fiber is total reflection of a light. That is, a light passing through two media of different refractive indices refracts at an interface of the two media, when a relation as shown in an equation (1) comes into existence, which is called as Snell's Law where n1, and n2 denote refractive indices of the two media, and θ1 denotes an incident angle and θ2 denotes a refraction angle.

$$n1 \sin \theta1 = n2 \sin \theta2$$

That is, when the light progresses from a medium with a high refractive index to a medium with a low refractive index, there is a specific incident angle at which the refraction angle is 90°, and for an incident angle greater than the specific angle, the light is reflected at the interface of the two media, which is called as total reflection.

The optical fiber employs such a total reflection, and FIG. 1 illustrates a related art optical fiber.

Referring to FIG. 1, the related art optical fiber is provided with a core 11 in a central part, and a cladding 12 surrounding the core 11. For causing total reflection, the refractive index of the core 11 is made higher than the refractive index of the cladding 12. Therefore, the light incident to the core 11 progresses as the light is totally reflected along the core 11 according to a condition of the total reflection.

However, it is matter of course that the light progressing along the core 11 is involved in phase change, with a change a polarization direction. Particularly, when the optical fiber is stressed by bending, or heat, or an external pressure, the optical fiber is involved in change of the refractive index, with further change of the phase. Therefore, though the related art optical fiber transmits a photo energy effectively, the related art optical fiber has a problem in that the related art optical fiber changes a polarization direction. In application fields of the polarization, an effective use of the polarization light has been difficult due to a loss caused by the polarization change of the optical fiber.

In the meantime, for maintaining a fixed polarization direction, even a single mode optical fiber is employed. However, the single mode optical fiber is required to be thinner than a few μm, has a limitation in a length thereof, and is susceptible to an external pressure or a stress caused by bending.

Meanwhile, as a display system for realizing a large sized screen, there is a projection display system in which a small picture is enlarged, and projected onto a large screen. Of the projection display systems, a projection display system employing a laser as a light source is under development, of which structure will be explained, briefly.

Referring to FIG. 2A, one exemplary related art projection display system is provided with a laser beam source 21 for emitting a laser beam, an illuminative optical system 22, a display panel 23, and an optical projection system 24. The display panel 23 displays a picture by controlling an amount of the laser beam in response to an electrical signal, and the picture is enlarged, and projected onto the screen 25 through the optical projection system 24.

Referring to FIG. 2B, another exemplary related art projection display system is provided with a laser beam source 31, an optical system 32, an AOM 33 for controlling a transmission amount of a laser beam in response to an electric signal related to a picture signal, a polygonal mirror 34 for providing a horizontal image by scanning the laser beam, and a galvanometer 35 for providing a vertical image by repetitive up and down rotation at a fixed angle. That is, the projection display system displays a picture on the screen 36 by rotation and angle combination of the galvanometer 35, and the polygon mirror 34.

The foregoing projection display system enhances clarity and reproducibility of colors, displays a picture with colors close to natural colors, and reproduces a clear picture quality as the picture has a high contrast.

However, the projection display system can not but have interference of the laser beam on the screen 25 or 36 caused by coherence of the laser beam, forming glittering speckles on the screen 25 or 36 coming from regular phases of the laser beam, that deteriorates picture quality, contrast, and resolution.

SUMMARY OF THE INVENTION

Accordingly, the present invention is directed to an optical fiber and a projection display system that substantially obviates one or more of the problems due to limitations and disadvantages of the related art.

An object of the present invention is to provide an optical fiber for maintaining a polarization direction of an incident beam to enhance optical utilization efficiency.

Another object of the present invention is to provide a projection display system, in which a light utilization efficiency is enhanced by using the optical fiber, and speckles caused by laser beam interference is eliminated, for providing an excellent picture quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the optical fiber includes a core, a cladding surrounding the core, having a refractive index lower than the core, and PBS (Polarization Beam Splitter) layers in an incident part and emission part at opposite ends of the core, for transmission of a particular polarized beam.

The PBS layer is a multilayered thin film coated on the incident part, or the emission part, or a thin polarization plate bonded to the incident part, or the emission part. The PBS layers in the incident part and the emission part have the same polarization directions of transmissive laser beams.

Therefore, according to the present invention, the beam incident to the core through the PBS layer in the incident part can not pass the PBS layer in the emission part but reflected into the core even if a polarization direction thereof is changed by external causes in the middle. If this process is repeated, a beam having the same polarization direction with the incident beam emits through the PBS layer in the emission part. At the end, the polarization direction of the emitted beam becomes the same with the polarization direction of the incident beam, thereby enhancing an optical utilization efficiency.

In another aspect of the present invention, there is provided a projection display system including a beam source for emitting a laser beam of a polarization direction, an optical fiber for totally reflecting the laser beam to transmit the laser beam therethrough, and maintaining the polarization direction, vibration means connected to the optical fiber at least one or more than point, for vibrating the optical fiber, to vary a phase of the laser beam passing through the optical fiber, a display panel for controlling an amount of the laser beam from the optical fiber in response to an electric signal, to provide a picture, and a projection optical system for enlarging, and projecting the picture from the display panel onto a screen.

As explained, there are PBS layers in the incident part and the emission part of the optical fiber, for transmission of laser beams of the same polarization direction.

Thus, according to the present invention, when the vibration means applies vibration to the optical fiber, a phase of the laser beam becomes irregular. As a result, the laser beam interferes each other and the speckles are eliminated. In this instance, as has been explained, even if there may be a polarization loss caused by variation of the polarization direction of the laser beam, the PBS layers can secure an optical utilization efficiency higher than a certain level.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings. In explaining the present invention, same parts will be given the same names and reference symbols, and iterative explanation of which will be omitted.

Figure 1:
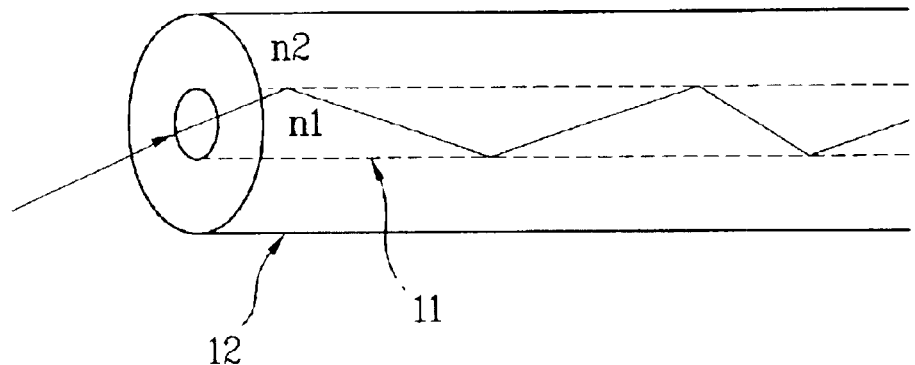
FIG. 1 illustrates a related art optical fiber.
Figure 2A:
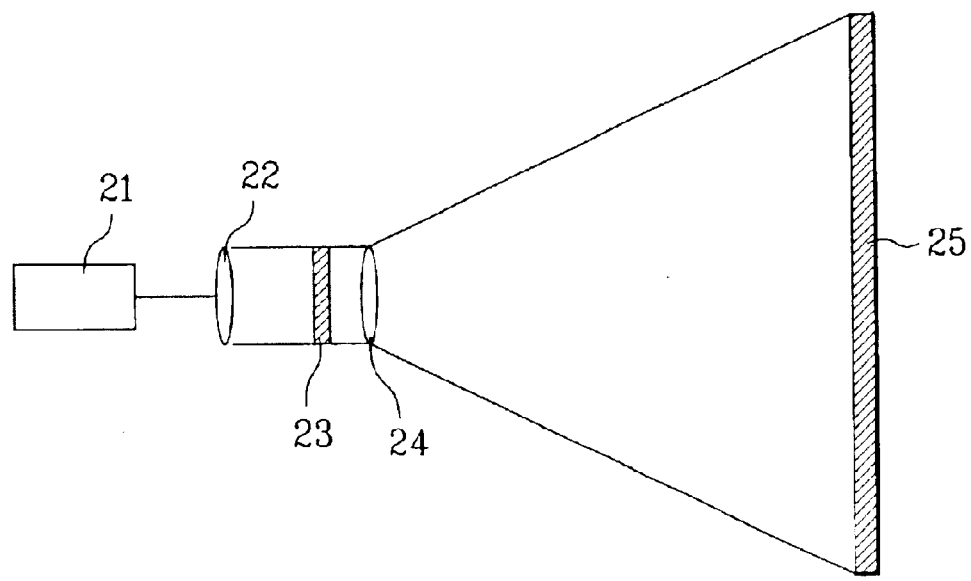
FIGS. 2A–2B illustrate related art projection display systems, schematically.
Figure 2B:
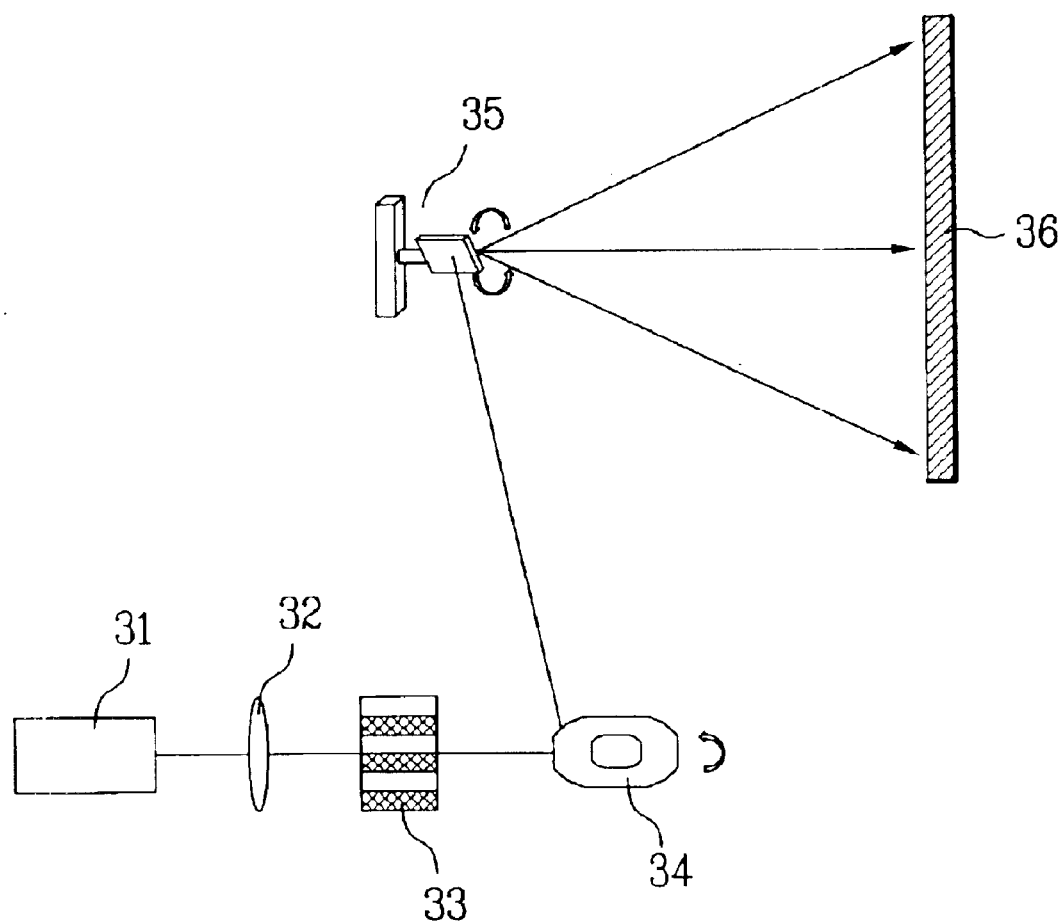
Figure 3:
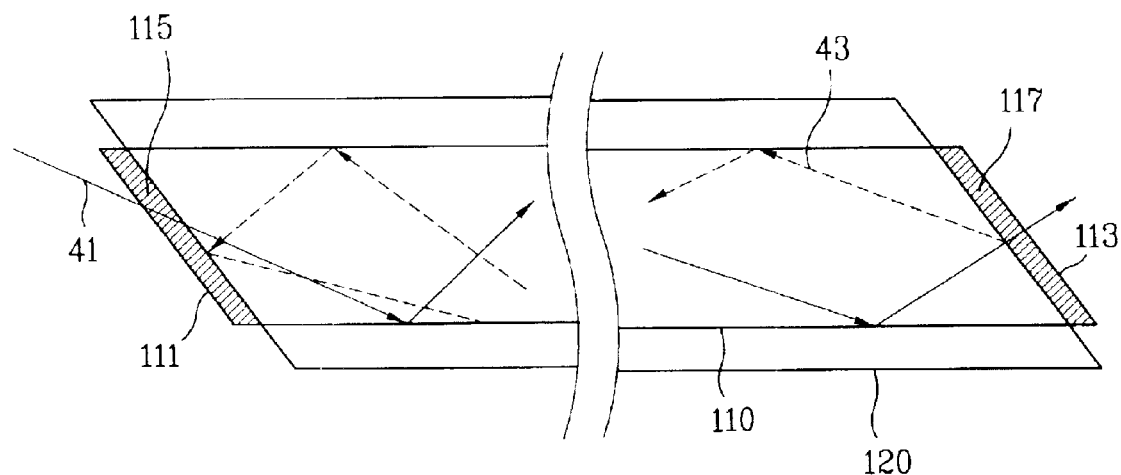
FIG. 3 illustrates an optical fiber and a function thereof in accordance with a preferred embodiment of the present invention.
Figure 4:
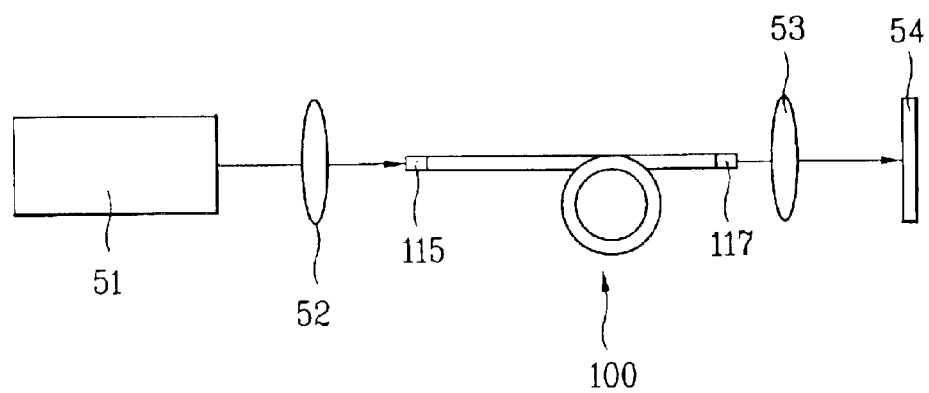
FIG. 4 illustrates one example of an optical system having the optical fiber in FIG. 3 applied thereto.

FIG. 3 illustrates an optical fiber and a function thereof in accordance with a preferred embodiment of the present invention, and FIG. 4 illustrates one example of an optical system having the optical fiber in FIG. 3 applied thereto.

Referring to FIG. 3, the optical fiber of the present invention includes a core 110 for providing a transmission passage, a cladding 120 for surrounding the core 110, and PBS (Polarization Beam Splitter) layers 115, and 117 on both ends of the core 110.

The core 110 has an incident part 111 and an emission part 113 on opposite ends. The core 110 has a refractive index greater than the cladding 120. Therefore, the light incident to the incident part 111 is totally reflected, to progress along the core 110 to the emission part 113. The incident part 111 and the emission part 113 are tilted at an angle with respect to an axis of the core 110.

The PBS layer 115, or 117 only transmits, or reflects a beam of a specific direction of polarization selectively. The polarization direction of a beam means a direction of vibration of the beam as the beam progresses, and the PBS layer (115, or 117) is a kind of filter that transmits only a beam of a specific vibration direction.

The PBS layer 115, or 117 may be a multilayered thin film directly coated on the incident part 111 or the emission part 113, or a thin polarization plate bonded to the incident part, or the emission part 113. The lights transmissive through the PBS layer 115 in the incident part and the PBS layer 117 in the emission part have the same polarization direction.

The function of the optical fiber of the present invention will be explained.

As an example, it is assumed that the PBS layer 115, or 117 transmits an S wave beam 41, and reflects a P wave beam 43. Of course, it is possible that a PBS layer having a property opposite to the foregoing PBS layer can be provided depending on designer.

When the S wave beam 41 is incident to the incident part 111, the S wave beam 41 transmits the PBS layer 115, and incident to the core 110. Then, the S wave beam 41 progresses to the emission part 113 along the core 110.

In this instance, while the S wave beam 41 progresses along the core 110, the S wave beam 41 is involved in a phase change, such that a polarization direction of the S wave beam 41 is changed. Particularly, when the optical fiber is bent, or an external cause, such as heat or pressure, is applied to the optical fiber, the change of the polarization direction will be greater. As a result, a part of the S wave beam 41, failing to maintain a proper polarization direction, is changed to the P wave beam 43, resulting in a state in which the S wave beam 41 and the P wave beam 43 are mixed in the core 110.

Thereafter, the S wave beam 41 and the P wave beam 43, progressing along the core 110, come to meet the PBS layer 117 in the emission part, when the P wave beam 43 is reflected, and progresses toward the incident part 111 along the core 111 again, while the S wave beam 41, transmits the PBS layer 117, and progresses to a destination.

Eventually, the P wave beam 43, failed to pass through the optical fiber, goes back and forth between the incident part 111 and the emission part 113, during which process, the P wave beam 43 is changed to the S wave beam 41 again due to a polarization direction change.

Then, the S wave beam 41 transmits the PBS layer 117 in the emission part, and progresses to the destination.

If such a process is repeated, the S wave beam 41 incident through the incident part 111 becomes the S wave beam 41 finally without any loss by repeating the change process, even if the S wave beam 41 is changed to the P wave beam 43 in the middle of the process. That is, the polarization direction of the emitted beam is maintained the same as the polarization direction of the incident beam.

Therefore, by minimizing an optical loss caused by the change of polarization direction, both the efficiency of beam utilization and an output can be enhanced.

In the meantime, if the incident beam is the P wave beam 43, the same result can be obtained by using PBS layer 115, or 117 which transmits the P wave beam 43 and reflects the S wave beam 41.

The foregoing optical fiber has a variety of optical applications. As an example, FIG. 4 illustrates an optical measuring instrument having the optical fiber of the present invention applied thereto.

Referring to FIG. 4, the optical measuring instrument includes a beam source 51, a plurality of optical systems 52, and 53, an optical fiber 100, and detector 54. As the beam source 51, a laser having a single polarization direction is employed. There are PBS layers 115, and 117 in the incident part and the emission part of the optical fiber 100, respectively.

The operation of the optical measuring instrument will be explained, briefly.

A laser beam from the beam source 51 is incident to the optical fiber 100 through the optical system 52. The laser beam emits from the optical fiber 100 in a polarization direction identical to the polarization direction of the incident beam maintained by the PBS layers 115, and 117. Then, the laser beam is directed to the detector 54 through the optical system 53. In this instance, in view of characteristics of the optical fiber 100, an output of the detector 54 can be enhanced without a loss of the laser beam.

Figure 5:
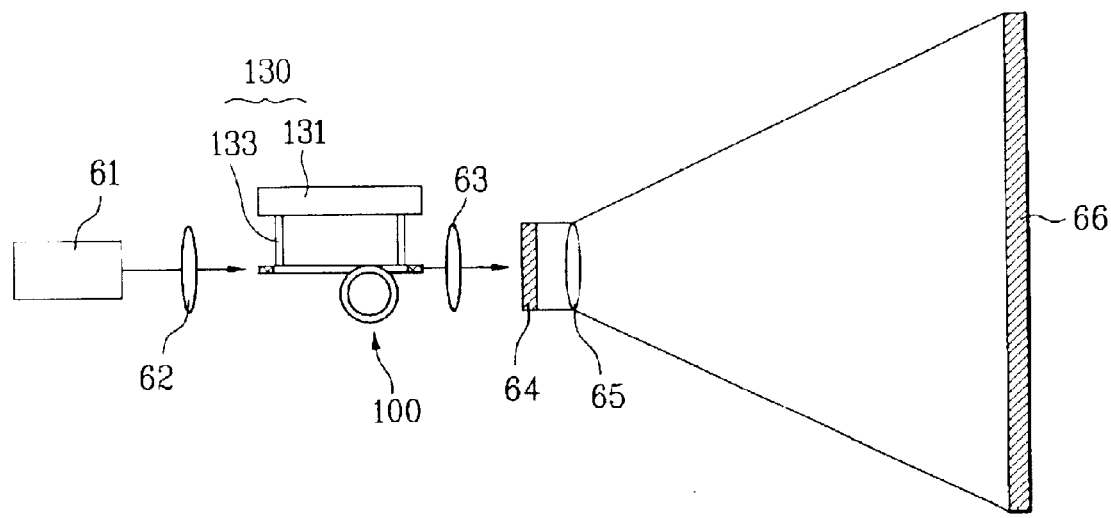
FIG. 5 illustrates a projection display system in accordance with a preferred embodiment of the present invention.

A projection display system having the optical fiber of the present invention applied thereto will be explained, in detail. FIG. 5 illustrates a projection display system in accordance with a preferred embodiment of the present invention, and FIG. 6 illustrates an optical fiber and a function thereof in the projection display system in FIG. 5.

Figure 6:
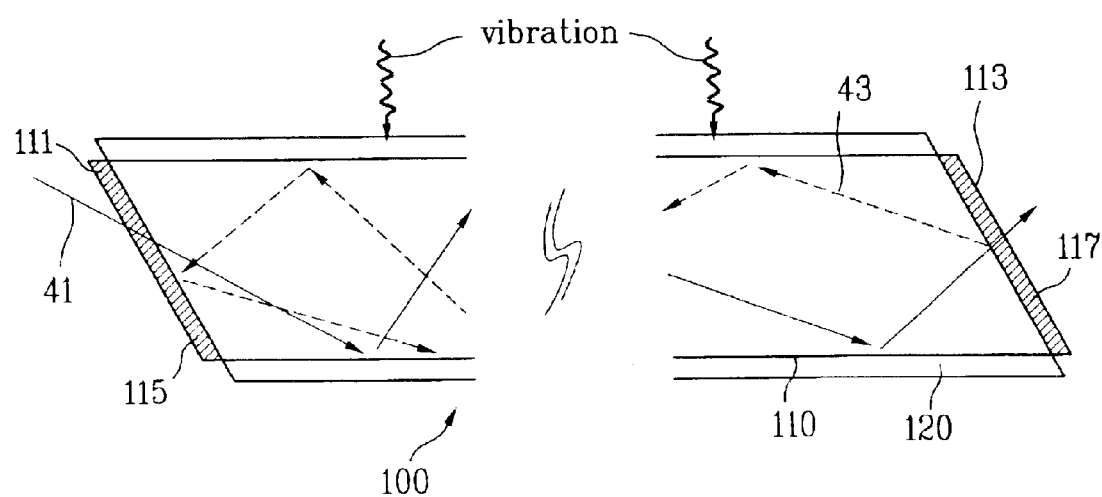
FIG. 6 illustrates an optical fiber and a function thereof in the projection display system in FIG. 5.

Referring to FIGS. 5 and 6, the projection display system includes a beam source 61 for emitting a laser beam having a fixed polarization direction, an optical fiber 100 for transmission of the laser beam while the polarization direction is maintained, vibration means 130 for applying vibration to the optical fiber 100 artificially, a display panel 64 for controlling an amount of the laser beam from the optical fiber by means of an electric signal, to provide a picture, and a screen 66 for displaying the picture from the display panel 64.

There is an illumination optical system 62 in front of the optical fiber 100 for focusing the laser beam emitted from the beam source 61, and there is a focusing optical system 63 in rear of the optical fiber 100 for focusing the laser beam from the optical fiber to the display panel 64. There is a projection optical system 65 in rear of the display panel 64 for enlarging and projecting the picture from the display panel onto a screen 66.

As explained, the optical fiber 100 maintains the polarization direction of incident laser beam and the polarization direction of the emitted laser beams identical. To do this, the optical fiber 100 has the incident part 111 and emission part 113 at opposite ends of the optical fiber 100 tilted at predetermined angles with respect to an axis direction of the core 110, in which the PBS layers 115, and 117 are formed, respectively. The PBS layers 115, and 117 transmit a laser beam of a specific polarization direction, and are formed of multilayered thin films coated on the incident part 111 and the emission part 113, or polarization plates directly bonded to the incident part 111 and the emission part 113, respectively.

The vibration means 130 varies a phase of the laser beam passing through the optical fiber 100 irregularly by vibrating the optical fiber 100 artificially, for elimination of the speckle caused by coherence of the laser beam.

To do this, the vibration means 130 includes an electrical or mechanical vibration source 131, and a vibration transmission member 133 between the vibration source 131 and the optical fiber 100 for transmission of vibration from the vibration source 131 to the optical fiber 100. As an example, there are two vibration transmission members 133 between the vibration source 131 and the optical fiber 100 shown in FIG. 5.

As the display panel 64, an LCD or a DMD (Digital Micromirror Device) may be employed. Taking a fact into account, that the beam directed to the display panel 64 is a laser beam, it is preferable that the display panel 64 is the LCD.

The operation of the projection display of the present invention will be explained, in detail.

At first, a laser beam having a polarization direction is emitted from the beam source 61. It is preferable that the laser beam is R, G, B color lights for reproducing a color picture.

Next, the laser beam is incident to the incident part in the optical fiber 100 through the illumination optical system 62.

Then, after the laser beam transmits the PBS layer 115, the laser beam progresses toward the emission part 113 as the laser beam is totally reflected along the core 110. In this instance, the vibration source 131 produces vibration, which is transmitted to the optical fiber 100 through the vibration transmission member 133. The vibration causes a stress in the optical fiber 100 by deforming the optical fiber 100, or acting as an external pressure, which changes the refractive index of the core 110 and/or the cladding 120, that varies the phase of the laser beam, irregularly. This irregular variation of the phase of the laser beam implies a reduced coherence, which eliminates the speckles caused by interference of the laser beam.

In the meantime, the polarization direction of a laser beam passing through the optical fiber 100 changes naturally, or by stress. Particularly, when the vibration means 130 applies a vibration, the polarization of the laser beam changes greatly. That is, a vibration direction of the laser beam varies irregularly with respect to a direction of progress. For an example, the laser beam from the beam source 61 is an S wave beam 41, there is an unwanted P wave beam 43 formed in the optical fiber 100. However, as explained, since there are the PBS layers 115, and 117 in the incident part 111 and the emission part 113, the P wave beam 43 is changed to the S wave beam 41 again, thereby eliminating the optical loss.

Then, the laser beam from the optical fiber 100 is focused onto the display panel 64 through the focusing optical system 63. The display panel 64 controls an amount of the laser beam, and presents a picture signal.

Then, the picture signal is enlarged through the projection optical system 65, and projected onto the screen 66.

As has been explained, the optical fiber and the projection display system thereof of the present invention have the following advantages.

First, the PBS layers 115, and 117 at opposite ends of the optical fiber permits to provide an emission beam having a polarization direction the same with the incident beam. Therefore, even if the optical fiber is bent, or a stress is occurred in the optical fiber by a temperature, or pressure, the optical fiber of the present invention can maintain the polarization direction, thereby enhancing an efficiency of utilization of light, and an output.

Second, the artificial application of vibration to the optical fiber 100 having the PBS layers 115 and 117 formed therein, which varies a phase of the laser beam irregularly, eliminates speckles, thereby providing clean and clear picture quality.

It will be apparent to those skilled in the art that various modifications and variations can be made in the optical fiber and the projection display system thereof of the present invention without departing from the spirit or scope of the invention. Thus, it is intended that the present invention cover the modifications and variations of this invention provided they come within the scope of the appended claims and their equivalents.

What is claimed is:

1. An optical fiber comprising:

a core;

a cladding surrounding the core, having a refractive index lower than the core; and PBS (Polarization Beam Splitter) layers in an incident part and emission part at opposite ends of the core, for transmission of a particular polarized beam;

wherein the incident part and the emission part are tilted at an angle with respect to an axis direction of the optical fiber and the PBS layers in the incident part and the emission part have the same polarization direction as the particular polarized beam.

2. An optical fiber as claimed in claim 1, wherein the PBS layer is a multilayered thin film coated on the incident part, or the emission part.

3. An optical fiber as claimed in claim 1, wherein the PBS layer is a thin polarization plate bonded to the incident part, or the emission part.

4. An optical fiber as claimed in claim 1, wherein the PBS layer transmits an S wave beam.

5. An optical fiber as claimed in claim 1, wherein the PBS layer transmits a P wave beam.

6. A projection display system comprising:

a beam source for emitting a laser beam of a polarization direction;

an optical fiber for totally reflecting the laser beam to transmit the laser beam therethrough, and maintaining the polarization direction, the optical fiber comprising an incident part and an emission part at opposite ends of the optical fiber, the incident part and emission part each tilted at an angle with respect to an axis direction of a fiber core and PBS layers in the incident part and the emission part for transmission of the laser beam of a particular polarization direction;

vibration means connected to the optical fiber at least one or more than point, for vibrating the optical fiber, to vary a phase of the laser beam passing through the optical fiber;

a display panel for controlling an amount of the laser beam from the optical fiber in response to an electric signal, to provide a picture; and a projection optical system for enlarging, and projecting the picture from the display panel onto a screen.

7. A projection display system as claimed in claim 6, wherein the PBS layer is a multilayered thin film coated on the incident part, or the emission part.

8. A projection display system as claimed in claim 6, wherein the PBS layer is a thin polarization plate bonded to the incident part, or the emission part.

9. A projection display system as claimed in claim 6, wherein the PBS layers in the incident part and the emission part have the same polarization directions of transmissive laser beams.

10. A projection display system as claimed in claim 9, wherein the PBS layer transmits an S wave beam.

11. A projection display system as claimed in claim 9, wherein the PBS layer transmits a P wave beam.

12. A projection display system as claimed in claim 6, wherein the vibration means includes;

an electric or mechanical vibration source, and a vibration transmission member between the vibration source and the optical fiber for transmission of the vibration from the vibration source to the optical fiber.

13. A projection display system as claimed in claim 6, wherein the display panel is an LCD or a DMD.

* * * * *